(12) United States Patent
Kanno

(10) Patent No.: US 6,870,559 B2
(45) Date of Patent: Mar. 22, 2005

(54) IMAGE FORMING APPARATUS

(75) Inventor: Satoru Kanno, Chiba (JP)

(73) Assignee: Canon Kabushiki Kaisha (JP)

( * ) Notice: Subject to any disclaimer, the term of this patent is extended or adjusted under 35 U.S.C. 154(b) by 79 days.

(21) Appl. No.: 10/404,910

(22) Filed: Apr. 1, 2003

(65) Prior Publication Data

US 2003/0214572 A1 Nov. 20, 2003

(30) Foreign Application Priority Data

Apr. 1, 2002 (JP) ..................................... 2002-098835
Apr. 1, 2002 (JP) ..................................... 2002-098836

(51) Int. Cl.$^7$ ........................... B14J 2/44; G02B 26/12; H04N 1/047; H04N 1/053
(52) U.S. Cl. ..................................... 347/250; 347/235
(58) Field of Search ................................. 347/235, 250, 347/259–261, 243; 359/216–219

(56) References Cited

U.S. PATENT DOCUMENTS 5,541,637 A * 7/1996 Ohashi et al. ............. 347/248
5,754,215 A * 5/1998 Kataoka et al. ............. 347/235
5,943,087 A * 8/1999 Kataoka et al. ............. 347/250

* cited by examiner

Primary Examiner—Huan Tran
(74) Attorney, Agent, or Firm—Bossi, Kimms & McDowell

(57) ABSTRACT

It is an object of the present invention to provide an image forming apparatus that is capable controlling the rotational speed of a polygon motor so as to reduce variations in the rotational speed of the polygon motor to the minimum possible level and enable steady rotation of the polygon motor with ease in controlling the rotational speed of the polygon motor to a target speed. When a photosensitive drum is exposure-scanned while the traveling direction of an exposure laser beam is deflected by the polygon mirror, a polygon motor for driving the polygon mirror is controlled according to target periods or target speeds of the polygon motor, which are determined for respective mirror planes of the polygon mirror.

11 Claims, 17 Drawing Sheets

FIG. 4
PRIOR ART

| ACC SIGNAL | DEC SIGNAL | FUNCTION |
|---|---|---|
| Low | Low | MAINTAIN SPEED |
| Low | High | INSTRUCT TO DECELERATE |
| High | Low | INSTRUCT TO ACCELERATE |
| High | High | MAINTAIN SPEED |

FIG. 11A  REFERENCE PLANE DETECTION SIGNAL
FIG. 11B  BD INPUT
FIG. 11C  Vtgt SIGNAL

FIG. 12

| BD FREQUENCY-DIVIDING MODE SIGNAL | OUTPUT SIGNAL (Vtgt) |
|---|---|
| 0 | SWITCH TO Vtgt1-Vtgt6 IN BD INPUT TIMING |
| 1 | VtgtT |

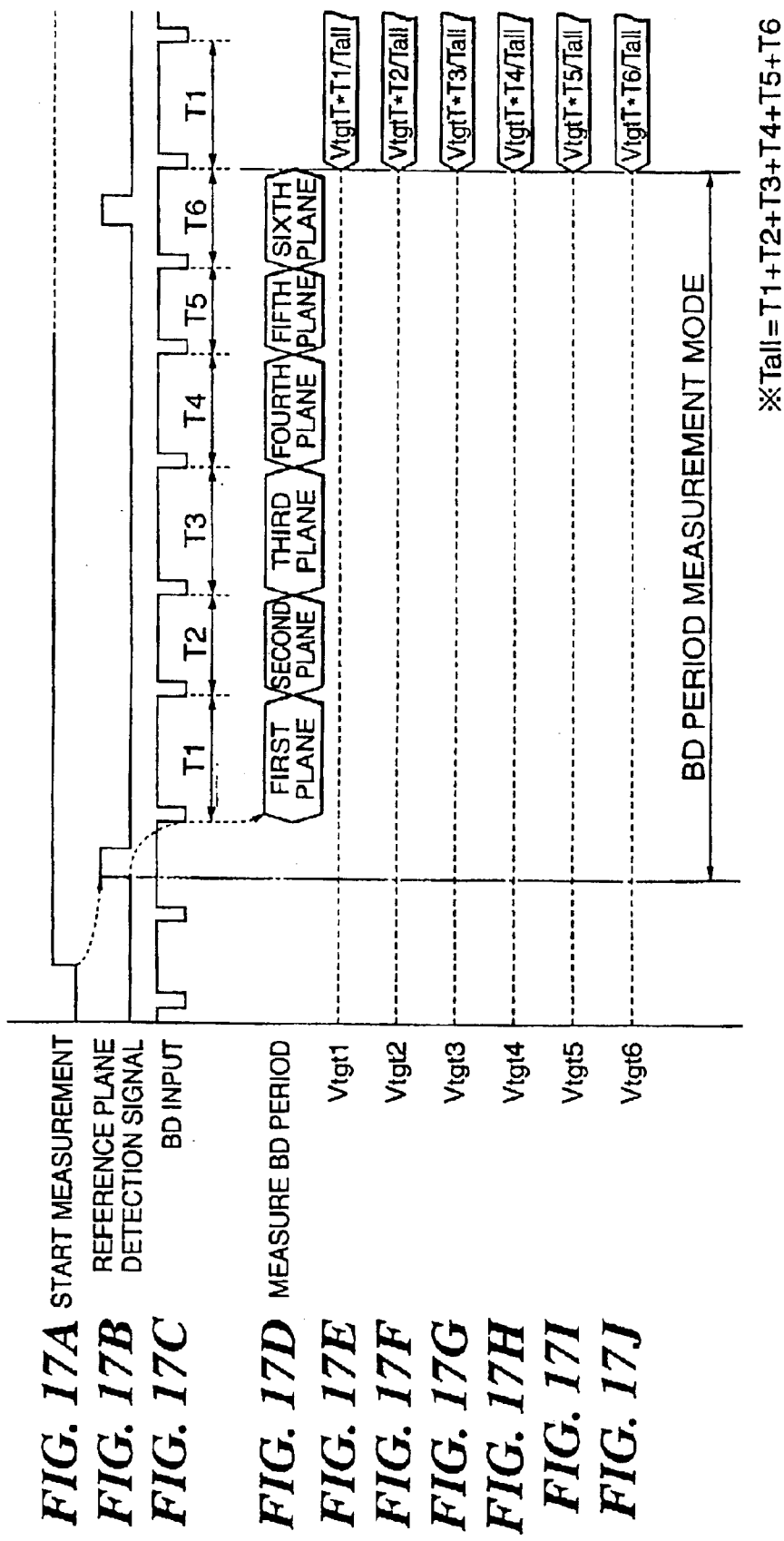

IMAGE FORMING APPARATUS

BACKGROUND OF THE INVENTION

1. Field of the Invention

The present invention relates to an image forming apparatus that controls the speed of a motor (polygon motor), which rotatively drives a rotary polygon mirror.

2. Description of the Related Art

Conventionally, it has been known that, when controlling the rotational speed of a motor (hereinafter referred to as "polygon motor") that rotates a rotary polygon mirror in an electrophotographic laser beam printer or the like, the rotational speed of the polygon motor is controlled such that the period of a main scanning synchronizing signal (hereinafter referred to as "the BD signal") generated based on a laser beam reflected from a reference position (for example, the leading end position) of each mirror plane of the rotary polygon mirror is made equal to the target period.

An exposure-scanning system of an electrophotographic printer is constructed as shown in FIG. 1. Referring to FIG. 1, a laser unit 102 turns on/off a laser beam according to an input image signal (video signal) 101 on a dot-by-dot basis. A laser beam 103 emitted from the laser unit 102 is irradiated on a rotary polygon mirror 105. A polygon motor 104 rotatively drives the polygon mirror 105 to deflect the laser beam 103.

An image-formation lens 106 is operable to focus a deflected laser beam 107 on a photosensitive drum 108. The irradiation of the laser beam 107 forms an electrostatic latent image corresponding to the image signal 101 on the photosensitive drum 108. The electrostatic latent image is developed as a toner image by a developing device, not shown, and transferred onto a recording sheet.

The polygon motor 104 rotates the polygon mirror 105 at a high speed of about 10000 to 20000 rpm. The photosensitive drum 108 is rotated one dot in a longitudinal direction (sub-scanning direction) while the laser beam 107 is swung once in the horizontal direction as viewed in FIG. 1 by one mirror plane of the polygon mirror 105, that is, while the photosensitive drum 108 is exposure-scanned one line in the main scanning direction by the laser beam 107.

A reflecting mirror 120 is disposed at such a location that the laser beam 107 is irradiated onto the reflecting mirror 120 when the leading end position in the main scanning direction is subjected to exposure scanning by the laser beam 107. The laser beam 107 reflected from the reflecting mirror 120 falls on a photoelectric conversion element 109. The photoelectric conversion element 109 performs photoelectric conversion of the incident laser beam 107 and outputs the result as the BD signal.

The BD signal is transmitted to a control circuit 111, which provides various kinds of control such as control of the rotation of the polygon motor 104, via a cable 110. Incidentally, as can be presumed from the above description, the BD signal is generated pulse by pulse for respective mirror planes of the polygon mirror 105. According to this prior art, since it is assumed that the polygon mirror 105 has six mirror planes, the BD signal is generated six times per rotation of the polygon mirror 105.

A description will now be given of a method of controlling the speed of the polygon motor 104 according to the prior art. FIG. 2 is a circuit block diagram showing the control circuit 111 in FIG. 1, and the polygon motor 104 and its related parts in FIG. 1 are schematically added to FIG. 2.

Note that the reflecting mirror 120 and its related parts for detecting the BD signal are omitted from FIG. 2.

As shown in FIG. 2, the BD signal is inputted to a frequency-dividing circuit 11. The frequency-dividing circuit 11 frequency-divides the BD signal by a value equal to the number of the mirror planes of the polygon mirror 105. According to the prior art, since it is assumed that the polygon mirror 105 has six mirror planes, the BD signal is frequency-divided by 6. The speed of the polygon motor 104 is then controlled based on the period of the BD signal (i.e. BD/6 signal) frequency-divided by the frequency-dividing circuit 11.

A description will now be given of the reason why the BD signal is frequency-divided. The mirror planes of the polygon mirror 105 are not identical with each other but differ in length, profile irregularity, and so forth. Thus, even when the polygon motor 104 is steadily rotating, there is a variation in the period of the actual BD signal.

FIG. 3A shows the state of the actual BD signal. Assuming that the polygon mirror 105 has six mirror planes, the BD signal shows periods T1, T2, T3, T4, T5, and T6 as it is generated by the respective mirror planes as shown in FIG. 3A, and then the respective BD signal pulses of these periods are cyclically generated.

In this case, even when the polygon motor 104 is rotating at a target speed, the speed of the polygon motor 104 cannot be properly controlled based on the BD signal if there is a variation in the periods T1–T6 of the respective BD signal pulses as shown in FIG. 3A.

On the other hand, by frequency-dividing the BD signal by 6 to generate the BD/6 signal, the BD signal can be shaped into one BD signal pulse (BD/6 signal) per rotation of the polygon motor 104 as shown in FIG. 3B. In this case, if the rotational speed of the polygon motor 104 is maintained at the target speed, the BD/6 signal has a constant period (Tround) without being affected by a variation in the profile irregularity of the mirror planes of the polygon mirror 105.

In other words, the BD/6 signal enables the rotational period of the polygon motor 104 to be accurately measured without being effected by a variation in the profile irregularity of the mirror planes of the polygon mirror 105. For the reasons explained above, the BD signal is frequency-divided by a value equal to the number of mirror planes of the polygon mirror 105, and the frequency-divided BD signal is used as a reference signal for detecting the speed of the polygon motor 104.

As shown in FIG. 2, the BD signal (BD/6 signal) divided by the frequency-dividing circuit 11 is inputted to a counter 12. The counter 12 is comprised of an up-counter that counts clocks, not shown, and is configured to clear its count value to measure the period of the BD/6 signal, i.e. the rotational period of the polygon motor 104 each time the BD/6 signal is inputted to the counter 12.

A comparator 13 compares the count value of the counter 12 (BDprd signal) and the target speed (Vtgt) with each other, and generates a control signal for instructing the polygon motor 104 to accelerate or decelerate according to the comparison result. It should be noted that a target speed corresponding to the BD/6 signal is set as the target speed Vtgt.

FIG. 4 shows the functions of an acceleration instruction signal (ACC signal) and a deceleration instruction signal (DEC signal) as output signals from the comparator 13.

Both the ACC signal and the DCC signal are high active signals, and as shown in FIG. 4, if only the ACC signal is at a high level, it means that the polygon motor 104 is instructed to accelerate, and if only the DEC signal is at a high level, it means that the polygon motor 104 is instructed to decelerate. If the ACC signal and the DEC signal are at the same level, it means that the polygon motor 104 is instructed to maintain its speed.

A description will now be given of examples of the operation of the comparator 13 with reference to timing charts of FIGS. 5A–5D and 6A–6E. In the examples shown in FIGS. 5A–5D and 6A–6E, the target speed (Vtgt) is set to 80. FIGS. 5A–5D show a case where the speed of the polygon motor 104 is lower than the target speed, and FIGS. 6A–6E show a case where the speed of the polygon motor 104 is higher than the target speed.

First, a description will be given of the case where the speed of the polygon motor 104 is lower than the target speed. As shown in FIG. 5A, in response to the input of a falling edge of the BD/6 signal, the counter 12 clears its count value (BDprd) to 0 (FIG. 5C). The counter 12 then increments its count value to 1, 2, 3, . . . in synchronism with clocks, not shown, and if the count value becomes greater than the value of 80 set as the target speed Vtgt, the comparator 13 outputs the ACC signal at a high level until the next falling edge of the BD/6 signal is inputted (FIG. 5D).

In this case, the lower the speed of the polygon motor 104 relative to the target speed, the longer the period of the BD/6 signal. It follows that the lower the speed of the polygon motor 104, the longer the high level width of the ACC signal.

A description will now be given of the case where the speed of the polygon motor 104 is higher than the target speed. As shown in FIG. 6A, assuming that the count value is 77 when a falling edge of the second BD/6 signal is inputted (FIG. 6C), the comparator 13 outputs the DEC signal with a high level width corresponding to an amount by which the speed of the polygon motor 104 is lower than the target speed of 80 (FIG. 6E).

In this case, the higher the speed of the polygon motor 104, the shorter the period of the BD/6 signal. It follows that the higher the speed of the polygon motor 104 relative to the target speed, the longer the high level width of the ACC signal.

If the speed of the polygon motor 104 is equal to the target speed, that is, if the period of the BD/6 is equal to Vtgt, both the ACC signal and the DEC signal are maintained at a low level.

As shown in FIG. 2, the ACC signal and the DEC signal generated by the comparator 13 are inputted to the motor driving section 14. The motor driving section 14 is comprised of constant current sources 19 and 20, switching elements 16 and 17, a charge pump capacitor 15, and an amplifier 18.

The constant current sources 19 and 20 and the switching elements 16 and 17 constitute a charge-discharge circuit for the charge pump capacitor 15. When the DEC signal goes high, the switching element 16 is turned on or closed to charge the charge pump capacitor 15 via the constant current source 19. When the ACC signal goes high, the switching element 17 is turned on or closed to discharge the charge pump capacitor 15 via the constant current source 20.

Therefore, the voltage of the charge pump capacitor 15 is increased or decreased in proportion to the high level width of the ACC signal and the DEC signal. The resulting voltage is transmitted to the motor driver 21 via the amplifier 18. The motor driver 21 supplies a current proportional to the voltage to the polygon motor 104, thus rotating the polygon motor 104.

If the rotational speed of the polygon motor 104 is lower than the target speed, the voltage of the charge pump capacitor 15 is increased to accelerate the polygon motor 104 because the ACC signal is at a high level. Conversely, if the rotational speed of the polygon motor 104 is higher than the target speed, the voltage of the charge pump capacitor 15 is decreased to decelerate the polygon motor 104 because the DEC signal is at a high level.

If both the ACC signal and the DEC signal are at a low level, the voltage of the charge pump capacitor 15 remains unchanged and the rotational speed of the polygon motor 104 is maintained since the switching elements 16 and 17 are off. As a result, the rotational speed of the polygon motor 104 stays at the target speed.

The conventional polygon motor control circuit 111, however, has the possibility that the rotational speed of the polygon motor 104 greatly varies because a variation in the rotational speed of the polygon motor 104 is detected at long time intervals corresponding to six pulses of the BD signal.

Further, due to long time intervals at which the ACC signal and the DEC signal are generated, it is difficult to tune the motor driving section 14 for steadily rotating the polygon motor 104. Specifically, the conventional polygon motor control circuit 111 has the problems, for example, that it is difficult to secure the voltage stability of the charge pump capacitor 15 and to adjust the acceleration/deceleration in response to one accelerating/decelerating instruction.

SUMMARY OF THE INVENTION

It is therefore an object of the present invention to provide an image forming apparatus that is capable controlling the rotational speed of a polygon motor so as to reduce variations in the rotational speed of the polygon motor to the minimum possible level and enable steady rotation of the polygon motor with ease in controlling the rotational speed of the polygon motor to a target speed.

To attain the above object, in a first aspect of the present invention, there is provided an image forming apparatus comprising a rotary polygon mirror having a plurality of mirror planes that deflect a traveling direction of an exposure light beam, a photosensitive body, and an exposure scanning section that exposure-scans said photosensitive body while causing said rotary polygon mirror to deflect the traveling direction of the exposure light beam, wherein the exposure scanning section comprises a polygon motor that rotatively drives the rotary polygon mirror, a setting device that sets a target rotation control variable of the polygon motor for each of the mirror planes of the rotary polygon mirror, and a control device that provides control to drive the polygon motor according to the target rotation control variable set by the setting device.

Preferably, the setting device sets target rotational speed of the polygon motor as the target rotation control variable.

More preferably, the setting device sets target rotational speeds of the polygon motor for respective ones of the mirror planes of the rotary polygon mirror according to one of lengths of the respective ones of the mirror planes of the rotary polygon mirror and rotational periods of the respective ones of the mirror planes of the rotary polygon mirror.

More preferably, the setting device sets target rotational speeds of the polygon motor for respective ones of the mirror planes of the rotary polygon mirror according to one of lengths of the respective ones of the mirror planes of the rotary polygon mirror and rotational periods of the respective ones of the mirror planes of the rotary polygon mirror, a sum of one of the lengths of the respective mirror planes of the rotary polygon mirror and the rotational periods of the respective ones of the mirror planes of the rotary polygon mirror, and the target rotational speed per rotation of the rotary polygon mirror.

More preferably, the setting device sets a plurality of target rotational speeds for each of the mirror planes of the rotary polygon mirror.

More preferably, the setting device sequentially sets target rotational speeds for respective ones of the mirror planes of the rotary polygon mirror according to a main scanning synchronizing signal generated based on light to be incident on predetermined positions of the respective ones of the mirror planes of the rotary polygon mirror.

More preferably, the setting device cyclically sets target rotational speeds for respective ones of the mirror planes of the rotary polygon mirror according to a detection signal indicative of a reference plane of the rotary polygon mirror.

Preferably, the setting device sets target period of the polygon motor as the target rotation control variable.

More preferably, the setting device sets a period with which the light beam irradiated on each of a plurality of exposure scanning lines of the photosensitive body from the rotary polygon mirror is incident on a predetermined position of each of the plurality of exposure scanning lines of the photosensitive body as the target rotation control variable.

More preferably, the setting device sets a ratio of a period of each of the mirror planes of the rotary polygon mirror to a sum of target periods of respective ones of the mirror planes of the rotary polygon mirror as the target rotation control variable.

More preferably, the setting device sets a period with the light beam irradiated on each of a plurality of exposure scanning lines of the photosensitive body from the rotary polygon mirror is incident on a plurality of positions of each of the plurality of exposure scanning lines of the photosensitive body as the target rotation control variable.

To attain the above object, in a second aspect of the present invention, there is provided an image forming apparatus comprising a rotary polygon mirror having a plurality of mirror planes that deflect a traveling direction of an exposure light beam, a photosensitive body, and an exposure scanning section that exposure-scans the photosensitive drum while causing the rotary polygon mirror to deflect the traveling direction of the exposure light beam, wherein the exposure scanning section comprises a measuring device that measures a state of the light beam irradiated on the photosensitive body from the rotary polygon mirror for each of the mirror planes of the rotary polygon mirror, a polygon motor that rotates the rotary polygon mirror, a setting device that sets a target rotation control variable of the polygon motor for each of the mirror planes of the rotary polygon mirror according to measurement results obtained by the measuring device, and a control device that provides control to drive the polygon motor according to the target rotation control variable set by the setting device.

Preferably, the measuring device measures a period with which the light beam irradiated on each of a plurality of exposure scanning lines of the photosensitive body from the rotary polygon mirror is incident on a predetermined position of each of the plurality of exposure scanning lines of the photosensitive body.

More preferably, the measuring device comprises a photoelectric conversion device that performs photoelectric conversion of the light beam, and a deflection incidence device that deflects the traveling direction of the light beam at a predetermined position in a main scanning direction of the light beam irradiated on the photosensitive body and makes the light beam incident upon the photoelectric conversion device, wherein the measuring device measures the period of the light beam irradiated on each of the plurality of exposure scanning lines of the photosensitive body from the rotary polygon mirror.

More preferably, the measuring device sets the period measured by the measuring device as the target rotation control variable of the polygon motor.

Further preferably, the setting device sets a ratio of a period of each of the mirror planes of the rotary polygon mirror to a sum of target periods of respective ones of the mirror planes of the rotary polygon mirror as the target rotation control variable of the polygon motor.

More preferably, the setting device comprises a frequency dividing device that frequency-divides the period measured by the measuring device, and a determination device that determines whether the polygon motor is steadily rotating according to periods obtained by dividing by the dividing device, wherein the setting device sets, as the target rotation control variable, target rotation control variables for respective ones of the mirror planes of the rotary polygon mirror according to a measurement result obtained by the measuring device after the determination device determines that the polygon motor is steadily rotating.

Preferably, the measuring device measures a period with which the light beam irradiated on each of a plurality of exposure scanning lines of the photosensitive body from teh rotary polygon mirror is incident on a plurality of positions of each of the plurality of exposure scanning lines of the photosensitive body.

Preferably, the measuring device measures speed of each of the mirror planes of the rotary polygon mirror.

More preferably, the measuring device sets the speed measured by the measuring device as the target rotation control variable of the polygon motor.

The above and other objects, features, and advantages of the invention will become more apparent from the following detailed description taken in conjunction with the accompanying drawings.

BRIEF DESCRIPTION OF THE DRAWINGS

FIGS. 3A and 3B show a timing chart of a BD signal and a BD/6 signal used in the conventional polygon motor control circuit, in which:

FIG. 3A shows the period of the BD signal; and

FIG. 3B shows the period of the BD/6 signal;

FIG. 4 is a diagram showing polygon motor rotational speed control signals used in the conventional polygon motor control circuit;

FIGS. 5A to 5E show a timing chart of various signals generated in the conventional polygon motor control circuit when the speed of the polygon motor is lower than a target speed, etc., in which:

FIG. 5A shows a BD/6 signal generated by a frequency dividing circuit;

FIG. 5B shows a set polygon motor target speed;

FIG. 5C shows a BD/6 signal count value obtained by a counter;

FIG. 5D shows an output signal from a comparator; and

FIG. 5E shows another output signal from the comparator;

FIGS. 6A to 6E show a timing chart of various signals generated in the conventional polygon motor control circuit when the speed of the polygon motor is higher than the target speed, etc., in which:

FIG. 6A shows a BD/6 signal generated by the frequency dividing circuit;

FIG. 6B shows the set polygon motor target speed;

FIG. 6C shows a BD/6 signal count value obtained by the counter;

FIG. 6D shows an output signal from the comparator; and

FIG. 6E shows another output signal from the comparator;

FIGS. 9A to 9C show a timing chart of signals generated in the polygon motor control circuit in FIG. 7, in which:

FIG. 9A shows a reference plane detection signal inputted to a target value switching section;

FIG. 9B shows a BD signal inputted to the target value switching section; and

FIG. 9C shows a target speed signal outputted from the target value switching section;

FIGS. 11A to 11C show a timing chart of signals generated in the polygon motor control circuit in FIG. 10, in which:

FIG. 11A shows a reference plane detection signal inputted to a target value switching section;

FIG. 11B shows a BD signal inputted to the target value switching section; and

FIG. 11C shows a target speed signal outputted from the target value switching section;

FIG. 12 is a diagram useful in explaining a BD frequency-dividing mode signal for discriminating a BD period measurement mode and a six-plane individual control mode from each other;

FIGS. 13A to 13J show a timing chart of various signals generated in the polygon motor control circuit in FIG. 10, etc., in which:

FIG. 13A shows a measurement start signal that is set by a CPU of the polygon motor control circuit;

FIG. 13B shows a reference plane detection signal inputted to a target value setting section of the polygon motor control circuit;

FIG. 13C shows BD signal inputted to the target value setting section;

FIG. 13D shows mirror planes of a polygon mirror whose BD signal periods are measured by the target value setting section;

FIG. 13E shows a target period set by the target value setting section;

FIG. 13F shows a target period set by the target value setting section;

FIG. 13G shows a target period set by the target value setting section;

FIG. 13H shows a target period set by the target value setting section;

FIG. 13I shows a target period set by the target value setting section; and

FIG. 13J shows a target period set by the target value setting section;

FIGS. 15A to 15E show a timing chart of signals generated in the polygon motor control circuit in FIG. 10, etc., in which:

FIG. 15A shows a BD frequency-dividing mode signal switched by the CPU of the polygon motor control circuit;

FIG. 15B shows a reference plane detection signal inputted to the target value switching section of the polygon motor control circuit;

FIG. 15C shows BD signal inputted to the target value switching section;

FIG. 15D shows target period signals outputted from the target value switching section; and FIG. 15E shows BD frequency-dividing mode signals set in a selector of the polygon motor control circuit;

FIGS. 17A to 17J show a timing chart of various signals generated in the polygon motor control circuit in FIG. 16, etc., in which:

FIG. 17A shows a measurement start signal that is set by a CPU of the polygon motor control circuit;

FIG. 17B shows a reference plane detection signal inputted to a target value setting section of the polygon motor control circuit;

FIG. 17C shows BD signal inputted to the target value setting section;

FIG. 17D shows mirror planes of a polygon mirror whose BD signal periods are measured by the target value setting section;

FIG. 17E shows a target period set by the target value setting section;

FIG. 17F shows a target period set by the target value setting section;

FIG. 17G shows a target period set by the target value setting section;

FIG. 17H shows a target period set by the target value setting section;

FIG. 17I shows a target period set by the target value setting section; and

FIG. 17J shows a target period set by the target value setting section.

DETAILED DESCRIPTION OF THE PREFERRED EMBODIMENTS

The present invention will now be described in detail with reference to the drawings showing preferred embodiments thereof.

Figure 7:
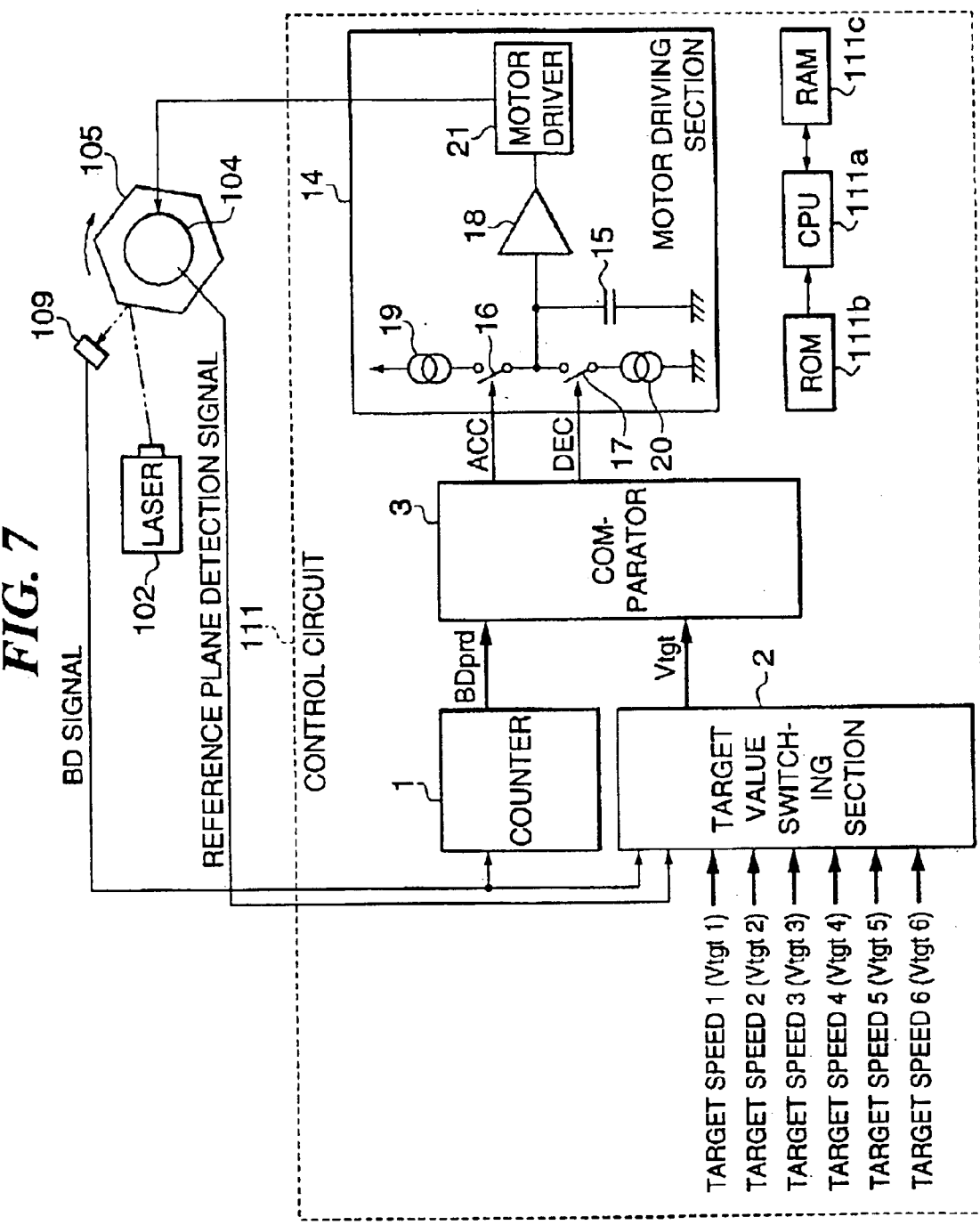
FIG. 7 is a block diagram showing the configuration of a polygon motor control circuit of an image forming apparatus according to a first embodiment of the present invention.

FIG. 7 is a block diagram showing a polygon motor control circuit of an image forming apparatus according to a first embodiment of the present invention. A control circuit 111 as the polygon motor control circuit according to the first embodiment controls the operations of a polygon motor and other various component parts, and is mounted in an electrophotographic printer as the image forming apparatus.

It should be noted that a polygon motor subjected to control and its related parts are schematically added to FIG. 7, and the reflecting mirror 120 (refer to FIG. 1) for detecting the BD signal is omitted from FIG. 7. Further, the construction of an exposure scanning system of the electrophotographic printer is basically the same as that of the conventional polygon motor control circuit shown in FIG. 1, and therefore description thereof is omitted with the corresponding elements and parts being denoted by the same reference numerals.

In FIG. 7, a reference plane detection signal becomes a high-level pulse during a period of time in which a specific mirror plane of the polygon mirror 105 is subjected to laser irradiation, and is used for detecting the specific mirror plane as a reference plane selected from among six mirror planes. A counter 1 is comprised of an up-counter that counts clocks, not shown, and clears its count value in response to each input of the BD signal, thus measuring the period of the BD signal, i.e. the rotational period of the polygon motor 104.

In response to each input of the BD signal, a target speed switching section 2 selects one from among predetermined target speeds corresponding in number to the number of mirror planes of the polygon mirror 105, and outputs the selected target speed as a Vtgt signal. The Vtgt signal is used as a target value of the BD signal at a later stage.

A description will now be given of how the target speeds 1 to 6 (Vtgt1 to Vtgt6) are determined.

The target speeds of the polygon motor 104 Vtgt1 to Vtgt6 for the respective mirror planes are calculated as described below. Where the length of the reference mirror plane of the polygon mirror 105 measured in advance is designated by L1, the lengths of the second to sixth mirror planes of the polygon mirror 105 measured in advance are designated by L2, L3, L4, L5, and L6, respectively, the sum of the lengths of the respective mirror planes of the polygon mirror 105 is designated by LA, and the target speed of the polygon motor 104 per rotation is designated by PolyPrd, the target speeds of the polygon motor 104 Vtgt1 to Vtgt6 for the respective mirror planes are calculated according to the following equations:

$$Vtgt1=(L1/LA) \times Polyprd$$

(the target value when the reference plane is subjected to laser irradiation)

$$Vtgt2=(L2/LA) \times Polyprd$$

(the target value when the second mirror plane is subjected to laser irradiation)

$$Vtgt3=(L3/LA) \times Polyprd$$

(the target value when the third mirror plane is subjected to laser irradiation)

$$Vtgt4=(L4/LA) \times Polyprd$$

(the target value when the fourth mirror plane is subjected to laser irradiation)

$$Vtgt5=(L5/LA) \times Polyprd$$

(the target value when the fifth mirror plane is subjected to laser irradiation)

$$Vtgt6=(L6/LA) \times Polyprd$$

(the target value when the sixth mirror plane is subjected to laser irradiation)

Figure 8:
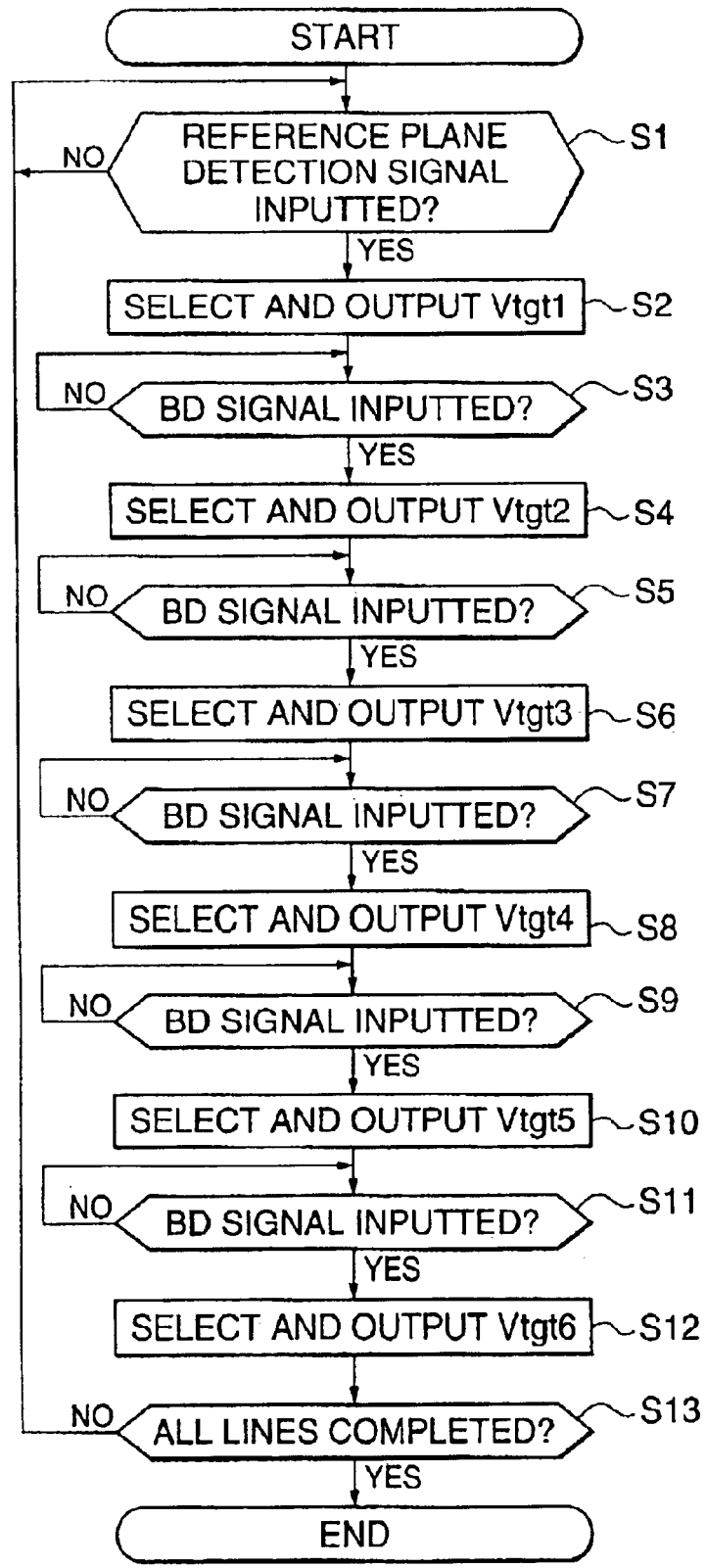
FIG. 8 is a flow chart showing a polygon motor target speed selecting process carried out by the polygon motor control circuit in FIG. 7.

A description will now be given of the operation of the target value switching section 2 with reference to a flow chart of FIG. 8 and a timing chart of FIGS. 9A to 9C.

First, after the input of the reference plane detection signal for the polygon mirror 105 (step S1), the target speed switching section 2 selects the target speed Vtgt1 as the output target speed Vtgt, and outputs the same to a comparator 3 in response to the input of the next falling edge of a pulse of the BD signal immediately after the input of the reference plane detection signal (step S2). Then, in response to the input of the falling edge of the next pulse of the BD signal (step S3), the target speed switching section 2 selects the target speed Vtgt2 as the output target speed Vtgt (step S4).

Thereafter, the target speed switching section 2 similarly switches the output target speed Vtgt to Vtgt3, Vtgt4, Vtgt5, and Vtgt6 (steps S6, S8, S10, and S12) in response to each input of a falling edge of the BD signal (steps S5, S7, S9, and S11).

Further, the reference plane detection signal for the polygon mirror 105 is inputted again just after the target speed Vtgt6 is selected, and thus the process returns to the step S1 where the target speed switching section 2 waits for the input of the reference plane detection signal, and after the input of the reference plane detection signal, the target speed switching section 2 switches the output target speed Vtgt to Vtgt1 in response to the input of the falling edge of a pulse of the BD signal immediately after the input of the reference plane detection signal (step S2).

Thereafter, the same processing is repeated until the exposure scanning of the photosensitive drum 108 for all lines in a main scanning direction is completed by a laser (step S13).

As described above, the target speed switching section 2 is operable to select the target speed according to the length of the mirror plane on which a laser beam is irradiated and to output the selected target speed to the comparator 3. On this occasion, the target speed Vtgt is selected and outputted in response to the input of a falling edge of the BD signal, the mirror plane on which a laser beam is currently irradiated and the target speed (Vtgt1 to Vtgt6) can be accurately correlated with each other.

As shown in FIG. 7, the comparator 3 compares the count value (BDprd signal) of the counter 1 and the target speed (Vtgt) outputted from the target speed switching section 2, and generates a control signal for instructing the polygon motor 104 to accelerate or decelerate according to the comparison result.

The operation of the acceleration/deceleration instruction signals outputted from the comparator 3 and the operation of a motor driving section 4 according to the instruction signals are identical with those of the conventional polygon motor control circuit, and therefore description thereof is omitted.

A description will now be given of effects obtained by the above described control of the polygon motor 104 with reference to the timing chart of FIGS. 9A to 9C.

Figure 9:
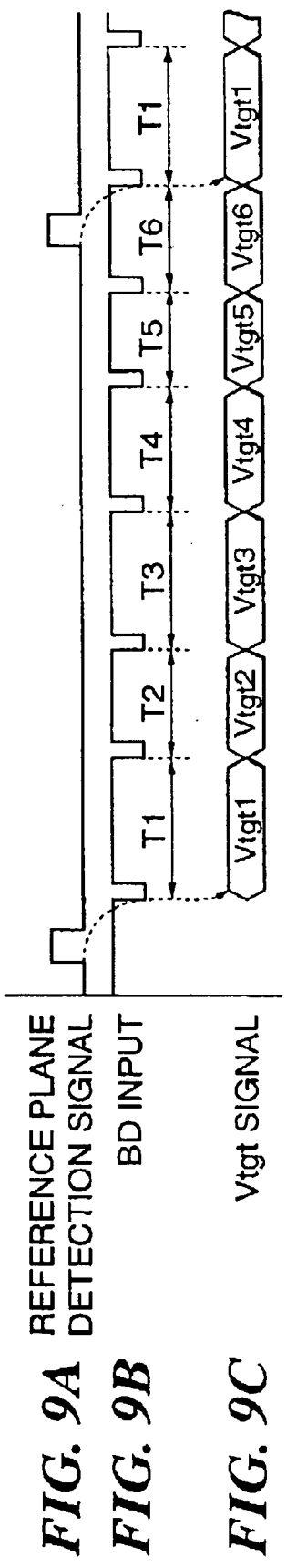

Even in the case where the speed of the polygon motor 104 has reached the target speed, there is a variation in the periods T1 to T6 of the BD signal as shown in FIG. 9B since the mirror planes of the polygon mirror 105 differ from each other in profile irregularity.

According to the present embodiment, however, the target speeds (Vtgt1 to Vtgt6) of the polygon motor 104 corresponding to the respective mirror planes of the polygon mirror 105 are switched to values corresponding to the lengths of the respective mirror planes (L1/LA×PolyPrd to L6/La×Polyprd). In other words, the target speeds (Vtgt1 to Vtgt6) of the polygon motor 104 are set in accordance with the respective corresponding mirror planes that are irradiated with the laser beam, and hence a variation in length between the mirror planes can be absorbed without the need of frequency-dividing the BD signal.

It should be noted that a CPU 111a controls the operation of the control circuit 111, and controls various processes according to control programs stored in a ROM 111b. During such control, the CPU 111a uses a RAM 111c as a work area.

As described above, according to the present embodiment, the speed of the polygon motor 104 is detected to generate an acceleration or deceleration signal in response to each input of the BD signal without frequency-dividing the BD signal by a value corresponding to the number of the mirror planes of the polygon mirror 105, and the rotational speed of the polygon mirror 105 is set in accordance with the respective corresponding mirror planes that are irradiated with a laser beam to absorb a variation in length between the mirror planes of the polygon mirror 105. As a result, it is possible to prevent the acceleration/deceleration signals (ACC signal/DEC signal) from being generated at unnecessarily long time intervals.

Further, since the speed of the polygon motor 104 is controlled without frequency-dividing the BD signal, the speed detection interval as well as the acceleration/deceleration signal interval can be reduced. This enables a simple control circuit to achieve steady rotation of the polygon motor 104 with a small variation in the rotational speed.

A description will now be given of a polygon motor control circuit of an image forming apparatus according to a second embodiment of the present invention with reference to the drawings.

The first embodiment described above has the problem that the cost can be increased due to the need of a memory or the like because the lengths of the respective mirror planes of the polygon mirror are measured before the attachment to a laser beam scanner, and the measured values are backed up in the memory or the like.

Further, the backed-up measured values are peculiar to the polygon mirror, and thus, if the polygon mirror is replaced by a new one due to a malfunction or the like, the backed-up measured values must be rewritten to values corresponding to the new polygon mirror, which requires a complicated operation to replace the polygon mirror. Further, incorrect input of back-up data would cause some trouble in controlling the speed of the polygon motor, and an image which reflects the input image signal faithfully may not be obtained.

To solve the above-mentioned problems, according to the second embodiment, the periods of the BD signal corresponding in number to the number of mirror planes of the polygon mirror are measured while the polygon motor is controlled to steadily rotate.

Figure 10:
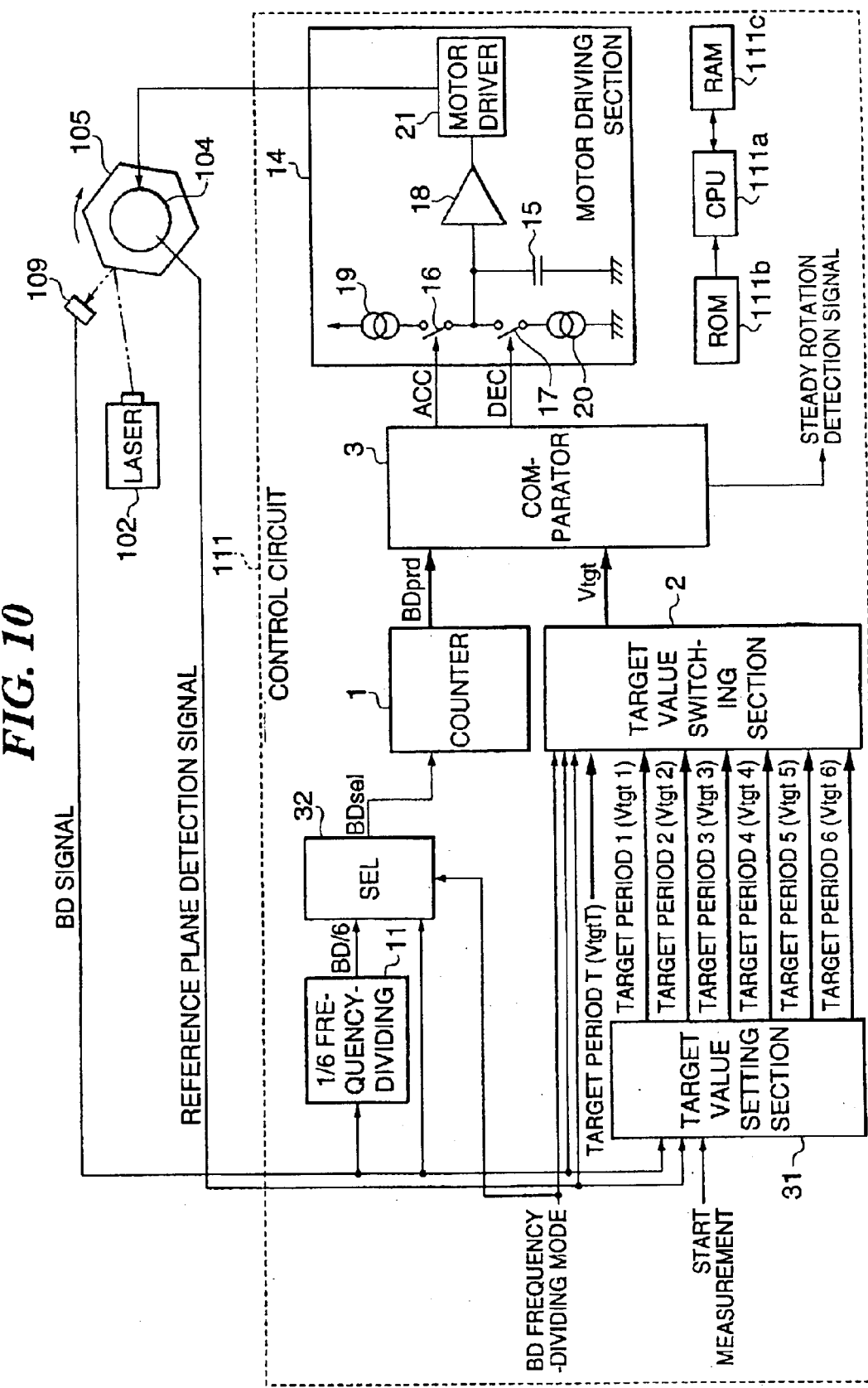
FIG. 10 is a block diagram showing the configuration of a polygon motor control circuit of an image forming apparatus according to a second embodiment of the present invention.

FIG. 10 is a block diagram showing the configuration of the polygon motor control circuit according to the second embodiment of the present invention. In FIG. 10, elements and parts corresponding to those shown in FIG. 7 are denoted by the same reference numerals.

In the present embodiment, it is also assumed that the polygon mirror 105 has six mirror planes, and accordingly the frequency-dividing circuit 11 frequency-divides the BD signal by 6, and outputs the result as the BD/6 signal to a selector 32.

The selector 32 switches the BD signal and the BD/6 signal to each other according to a "BD frequency-dividing mode" signal. The BD frequency-dividing mode signal can assume a value "1" or "0". The BD frequency-dividing mode signal is set to "1" to indicate a "BD frequency-dividing mode", is set to "0" to indicate a "six-plane individual control mode". If the BD frequency-dividing mode signal indicates the BD frequency-dividing mode, the selector 32 selects the BD/6 signal, and if the BD frequency-dividing mode signal indicates the six-plane individual control mode, the selector 32 selects the BD signal. The selector 32 outputs the selected signal representing mode information as a BDsel signal to the counter 1. According to the present embodiment, the rotational speed of the polygon motor 104 is controlled according to the period of the BDsel signal.

Incidentally, the BD frequency-dividing mode is a mode in which the BD signal is frequency-divided by a value corresponding to the number of mirror planes of the polygon mirror 105, and the rotational speed of the polygon motor 104 is controlled according to the BD signal (pulse) that is generated once per rotation of the polygon motor 104. The six-plane individual control mode is a mode in which pulses of the BD signal corresponding to the respective mirror planes of the polygon mirror 105 is used as they are without being divided, and the rotational speed of the polygon motor 104 is controlled while the period of the BD signal is reset as the target period of the polygon motor 104 each time the BD signal is inputted (refer to FIG. 12).

The counter 1 is comprised of an up-counter that counts clocks, not shown. The counter 1 clears its count value in response to each input of the BD signal or the BD/6 signal from the selector 32, thus measuring the period of the BD signal or the BD/6 signal, that is, the period of laser beam irradiation on each mirror plane of the polygon mirror 105 or the period of one rotation of the polygon mirror 105.

A target value setting section 31 first measures the period of the BD signal, and sets the measured period of the BD signal as the target period of the polygon motor 104.

First, a description will now be given of a BD signal period measuring process carried out by the target value setting section 31 with reference to a timing chart of FIGS. 13A to 13J.

Figure 13:
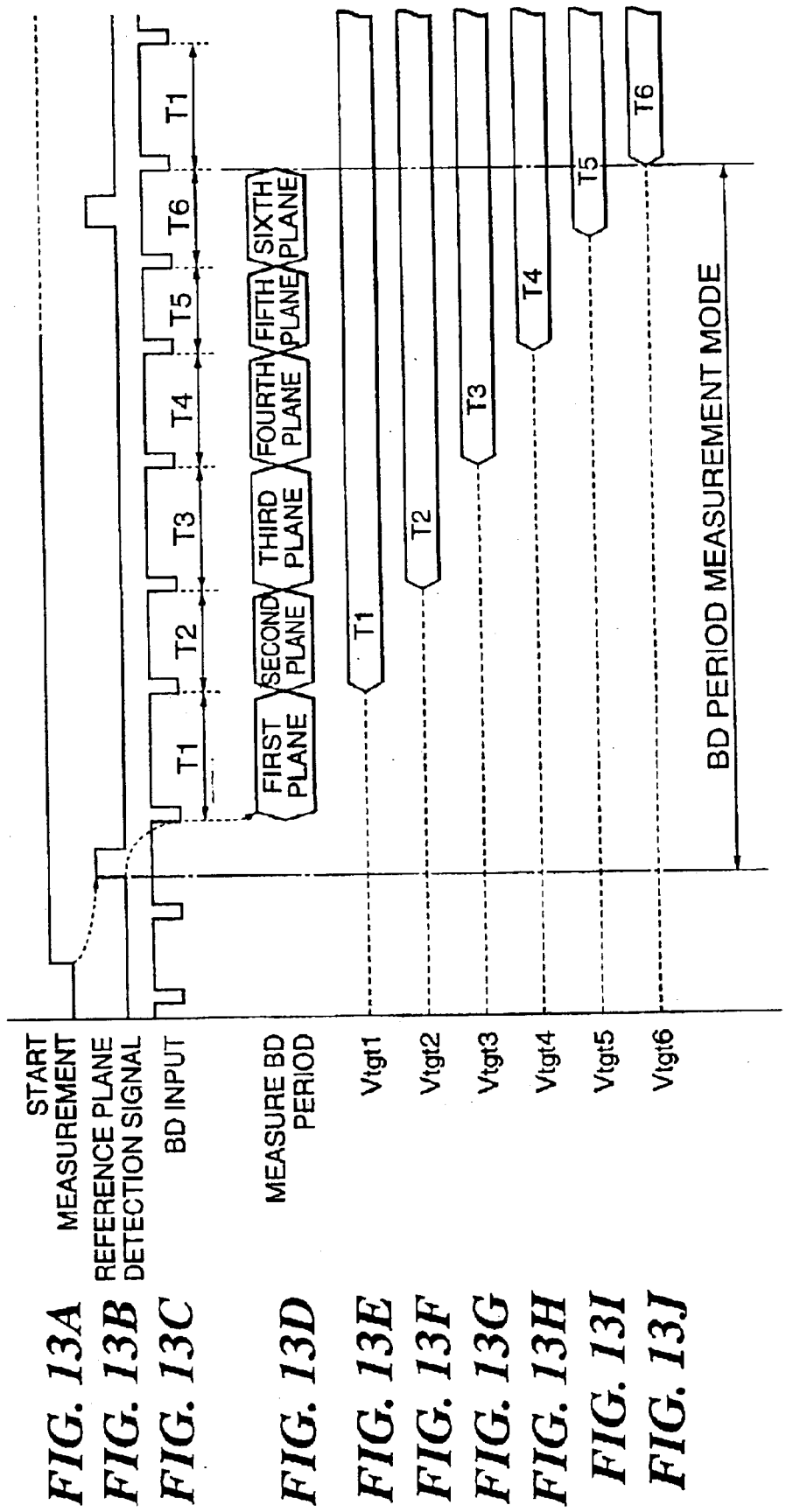

After a measurement start signal is set to a high level by the CPU 111a ("L" to "H") (FIG. 13A), the target value setting section 31 enters a BD signal period measuring mode in response to the input of the first pulse of the reference plane detection signal immediately after the set of the measurement start signal (FIG. 13B). Then, in response to the input of the BD signal immediately after the input of the first pulse of the reference plane detection signal (FIG. 13C), the target value setting section 31 starts measuring the period of the BD signal (FIG. 13D).

The target value setting section 31 then sets the period T1 of the first pulse of the BD signal inputted first as the target period Vtgt 1 for the first plane (i.e. the reference plane) of the polygon mirror 105 (FIG. 13E), and sets the period T2 of the second pulse of the BD signal inputted second as the target period Vtgt 2 for the second plane of the polygon mirror 105 (FIG. 13F).

Similarly, the target periods Vtgt3, Vtgt4, Vtgt5, and Vtgt6 for the third, fourth, fifth, and sixth planes, respectively, of the polygon mirror 105 are then sequentially set in response to each input of the BD signal (FIGS. 13G to 13J). The target periods Vtgt1 to Vtgt6 thus set for the respective mirror planes by the target value setting section 31 are then sequentially outputted to the target value switching section 2.

A description will now be given of a target value switching process carried out by the target value switching section 2 with reference to FIGS. 12 and 15A to 15E.

The target value switching section 2 outputs the signal Vtgt as shown in FIG. 12 to the comparator 3. Specifically, if the BD frequency-dividing mode signal assumes "1" indicative of the BD frequency-dividing mode, a period VtgtT per rotation of the polygon motor 104 is outputted as the Vtgt signal, and if the BD frequency-dividing mode signal assumes "0" indicative of the six-plane individual control mode, each of the target periods Vtgt1 to Vtgt6 for the respective planes of the polygon mirror 105 is outputted as the Vtgt signal.

A detailed description will now be given of this target period switching process carried out by the target value switching section 2 with reference to the timing chart of FIGS. 15A to 15E.

If the BD frequency-dividing mode signal assumes "1" indicative of the BD frequency-dividing mode (FIG. 15E), the target value switching section 2 outputs the period VtgtT per rotation of the polygon motor 104 as the Vtgt signal, as stated above. Thereafter, the period VtgtT per rotation is fixed without being changed even if the BD signal is inputted.

Figure 15:
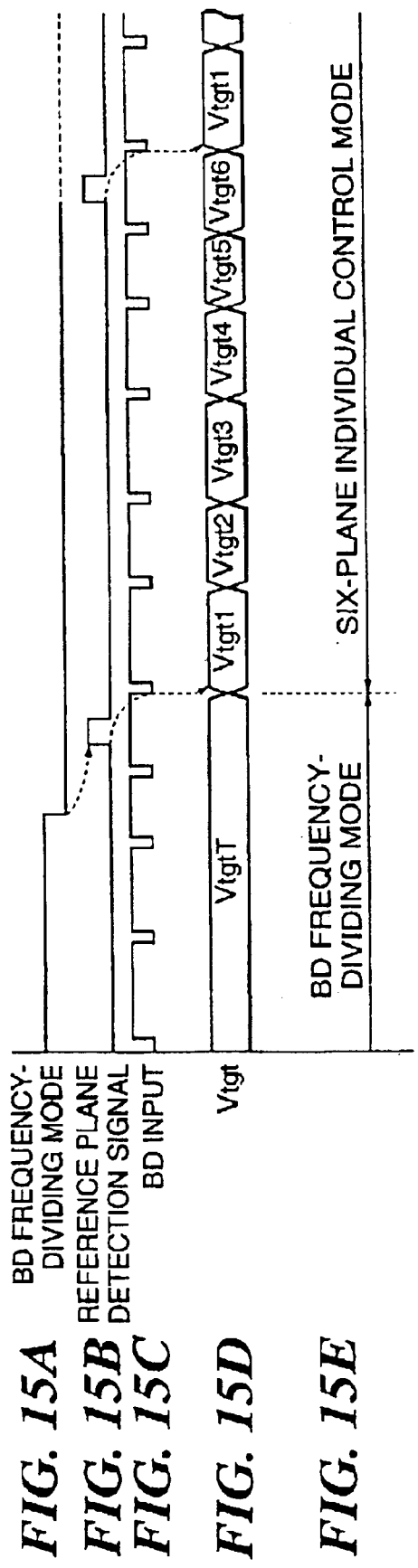

On the other hand, if the CPU 111a switches the BD frequency-dividing mode signal to "0" (FIG. 15A), the target value switching section 2 enters the six-plane individual control mode in response to the input of the first pulse of the reference plane detection signal immediately after the switching of the BD frequency-dividing mode signal and the input of the first pulse of the BD signal immediately after the input of the first pulse of the reference plane detection signal (FIG. 15E). In the six-plane individual control mode, the target value switching section 2 selects the Vtgt1 (the target period for the first mirror plane) as the Vtgt signal in timing in which the first pulse of the BD signal is inputted after the detection of the first pulse of the reference plane detection signal (FIGS. 15B and 15C). Thereafter, in synchronism with each input of a subsequent pulse of the BD signal, the target value switching section 2 switches the target period Vtgt to Vtgt2, Vtgt3, . . . , Vtgt6 (FIG. 15D). Such a sequence in which the target period is switched to values corresponding to the respective mirror planes is cyclically repeated every rotation of the polygon motor 104.

The comparator 3 compares the count value (BDprd signal) of the counter 1 and the target period (Vtgt) outputted from the target value switching section 2, and generates a control signal for instructing the polygon motor 104 to accelerate or decelerate according to the comparison result. This control signal is the same as the one generated in the conventional polygon motor control circuit described above with reference to FIG. 4, and therefore description thereof is omitted. Also, the operation of the motor driving section 14 is identical with that of the conventional polygon motor control circuit described above with reference to FIGS. 5A to 5E and 6A to 6E, and therefore description thereof is omitted.

Figure 14:
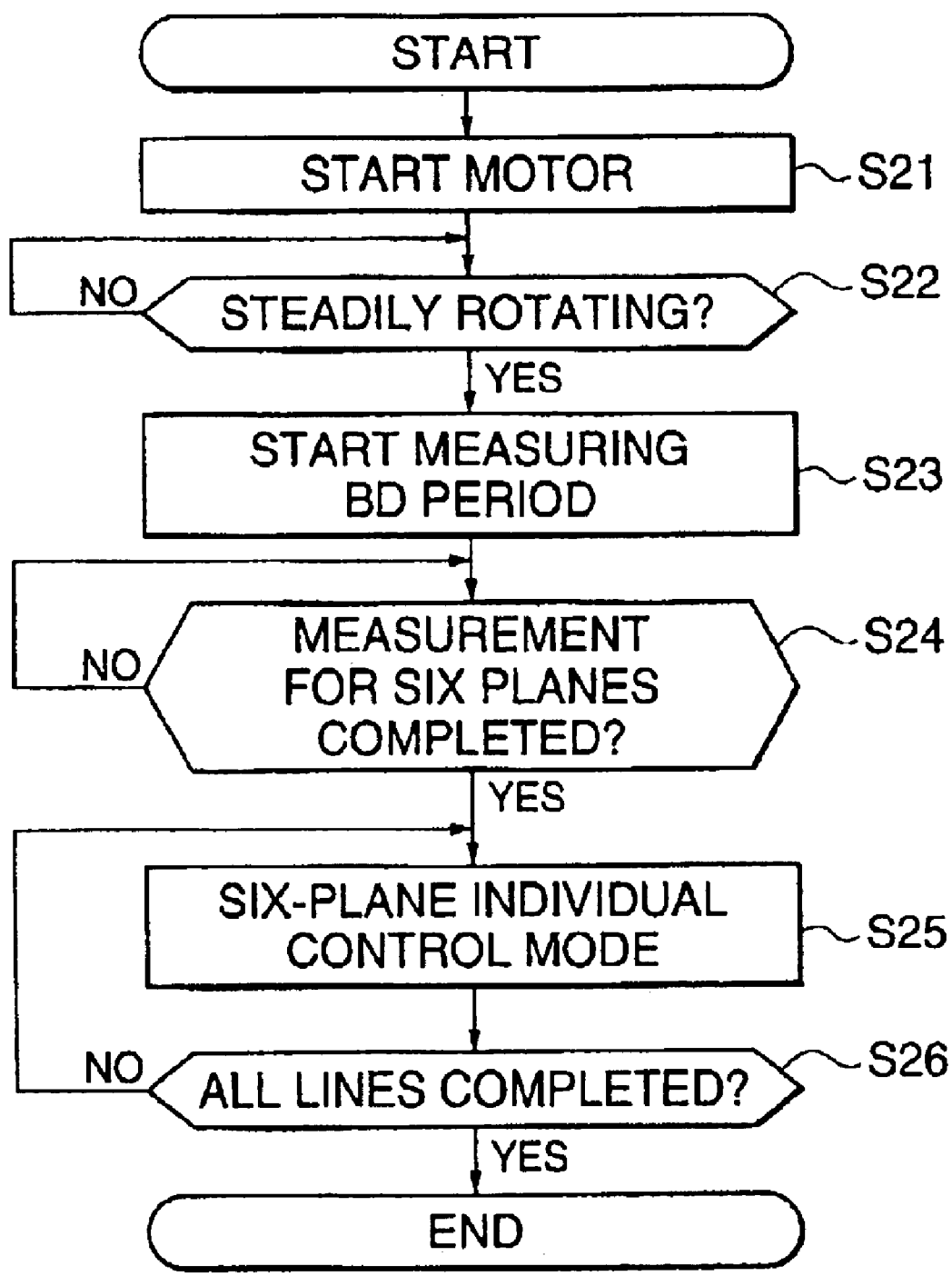
FIG. 14 is a flow chart showing a polygon motor control process carried out by the polygon motor control circuit in FIG. 10.

A description will now be given of the procedure for controlling the speed of the polygon motor 104 with reference to a flow chart of FIG. 14.

The CPU 111a starts the polygon motor 104 according to a printing instruction outputted from an operating section, not shown (step S21). On this occasion, the CPU 111a sets the BD frequency-dividing mode signal to "1" to set the BD frequency-dividing mode, and causes the laser unit 102 to generate a laser beam so as to generate the BD signal. Further, the CPU 111a sets the target VtgtT per rotation of the polygon motor 104 as the target period Vtgt of the polygon motor 4.

The CPU 111a then determines whether the polygon motor 104 has come to steadily rotate or not, according to a steady rotation detection signal outputted from the comparator 3 (step S22). If the CPU 111a determines that the polygon motor 104 has not come to steadily rotate, the process returns to the step S22 wherein the CPU 111 waits for the polygon motor 104 to reach a steady rotating state.

On the other hand, if determining in the step S22 that the polygon motor 104 has come to steadily rotate, the target value switching section 2 enters the BD period measurement mode to measure the period of the BD signal (step S23). On this occasion, as described above, the periods of the BD signal corresponding to the respective mirror planes of the polygon mirror 105 are measured according to the procedure shown in FIGS. 13A to 13J.

Figure 11:
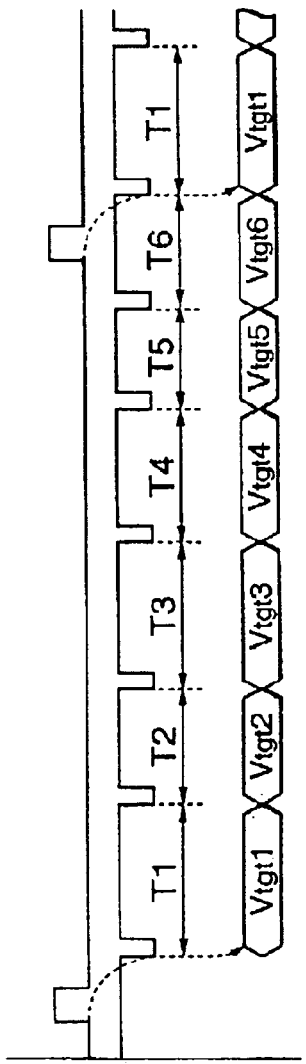

Then, the CPU 111a waits for the measurement of the periods of the BD signal for the six mirror planes to be completed (step S24), and then the target value switching section 2 enters the six-plane individual control mode (step S25). After the CPU 111a enters the six-plane individual control mode, thee CPU 111a operates in the same way as shown in the timing chart of FIGS. 11B and 11C.

Specifically, in synchronism with the input of the first pulse of the BD signal immediately after the input of the reference plane detection signal, the target period Vtgt1 is set as the target period Vtgt. Thereafter, the target Vtgt is switched to Vtgt2, Vtgt3, . . . , Vtgt6 in response to each input of a subsequent pulse of the BD signal, and this sequence is repeated each time the reference plane detection signal is inputted. The repetition of this sequence is continued until the exposure-scanning of the photosensitive drum 108 is completed for all the lines in the main scanning direction (step S26).

In this way, according to the second embodiment of the present invention, a variation in length between the mirror planes of the polygon mirror 105 is recognized by measuring the periods of the BD signal for the respective mirror planes with respect to the period per rotation of the polygon motor 104 while the polygon motor 104 is steadily rotating.

As a result, when the polygon mirror is replaced with a new one due to a malfunction or the like, there is no necessity of performing such a complicated operation that the lengths of the respective mirror planes of the new polygon mirror are separately measured and written into a memory. Further, it is possible to solve the problem that writing incorrect lengths of the respective mirror planes into the memory causes some trouble in controlling the speed of the polygon motor, making it impossible to obtain a desired image.

Further, since the speed of the polygon motor is controlled according to the BD signal without being frequency divided, the period (speed) detection interval and the acceleration/deceleration signal interval can be reduced. It is therefore possible to easily realize a polygon motor control circuit that enables the polygon motor to rotate steadily with very slight speed variations.

Although not mentioned above for the convenience of explanation, it should be noted in the present embodiment that the rotation of the polygon motor 104 must be inhibited from being controlled unstably when the BD frequency-dividing mode and the six-plane control mode are switched to each other.

Further, backing up the measured target periods for the respective mirror planes once in a memory and using the backed-up data in controlling the speed of the polygon motor during subsequent image formation eliminate the necessity of measuring a variation in the mirror planes when power to the image forming apparatus is turned on, thus making it possible to promptly start image formation.

A description will now be given of a polygon motor control circuit of an image forming apparatus according to a third embodiment of the present invention with reference to the drawings.

According to the second embodiment described above, the periods are set as the target values used for controlling the speed of the polygon motor 104, but according to the third embodiment, speeds (rotational speeds) are set as the target values.

Figure 16:
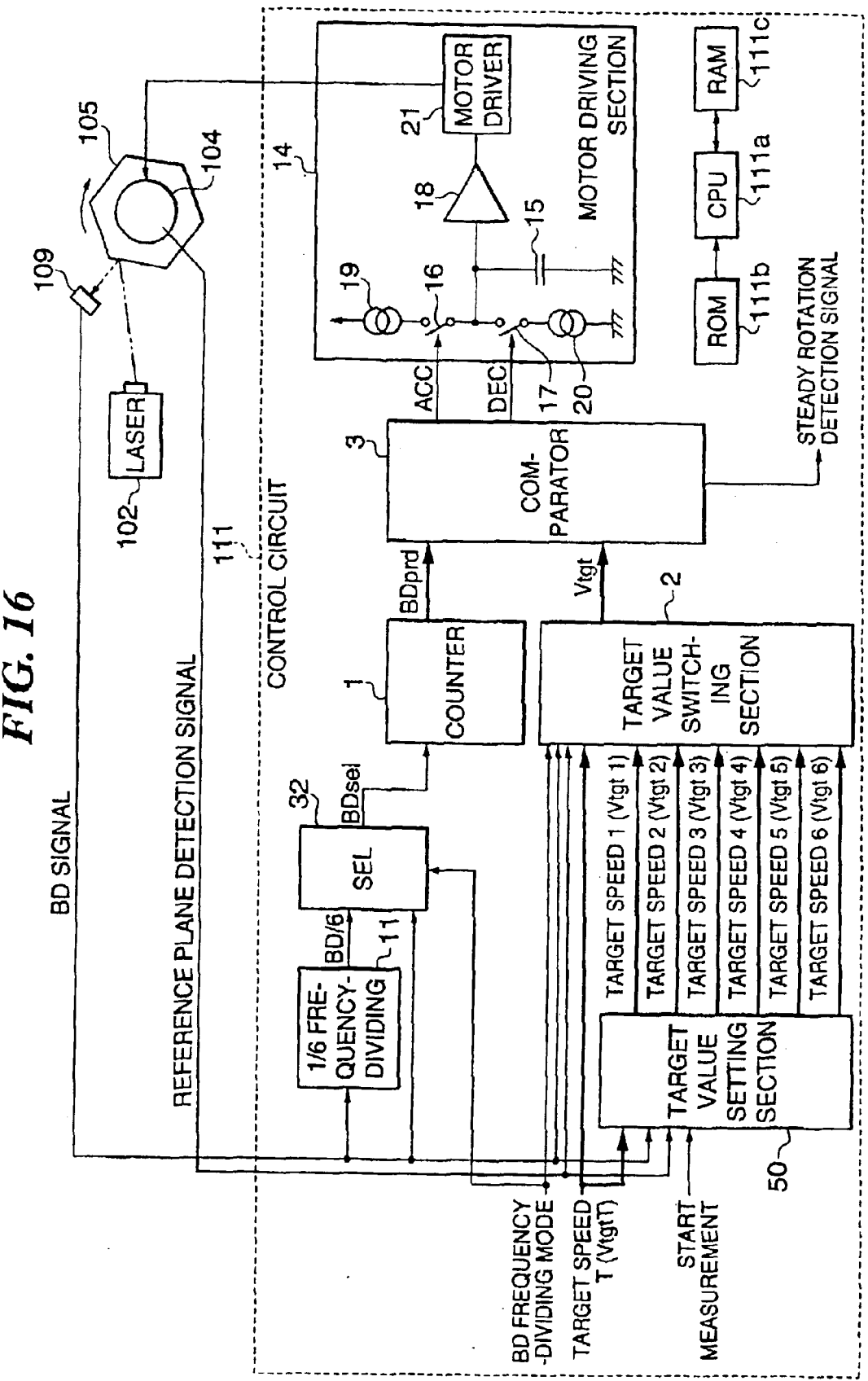
FIG. 16 is a block diagram showing the configuration of a polygon motor control circuit of an image forming apparatus according to a third embodiment of the present invention.

FIG. 16 is a circuit block diagram showing the polygon motor control circuit of the image forming apparatus according to the third embodiment of the present invention. It should be noted that the third embodiment differs from the second embodiment only in the operation of a target value setting section 50, and therefore description of other component parts not related thereto is omitted.

In the control circuit 111 serving as the polygon motor control circuit according to the third embodiment, the target value setting section 50 is operable as shown in a timing chart of FIGS. 17A to 17J. Specifically, in response to setting of the measurement start signal by the CPU 111a ("L"->"H") (FIG. 17A), the target value setting section 50 enters the BD signal target measurement mode (FIG. 17B) in response to the input of the first pulse of the reference plane detection signal immediately after the setting of the measurement start signal. Then, in response to the input of the first pulse of the BD signal immediately after the input of the first pulse of the reference plane detection signal (FIG. 17C), the target value setting section 50 starts measuring the period of the BD signal (FIG. 17D). After measuring the periods for the six mirror planes (FIGS. 17E to 17J), the target value setting section 50 sets the target speeds for the respective mirror planes by performing calculations according to the following equations:

$$Vtgt1 = VtgtT \times T1/Tall$$

(the target speed when the first mirror plane is subjected to laser irradiation)

$$Vtgt2 = VtgtT \times T2/Tall$$

(the target speed when the second mirror plane is subjected to laser irradiation)

$$Vtgt3 = VtgtT \times T3/Tall$$

(the target speed when the third mirror plane is subjected to laser irradiation)

$$Vtgt4 = VtgtT \times T4/Tall$$

(the target speed when the fourth mirror plane is subjected to laser irradiation)

$$Vtgt5 \times VtgtT \times T5/Tall$$

(the target speed when the fifth mirror plane is subjected to laser irradiation)

$$Vtgt6 = VtgtT \times T6/Tall$$

(the target speed when the sixth mirror plane is subjected to laser irradiation)

where Tall is the sum of the periods of the BD signal for the six mirror planes, i.e. the period per rotation of the polygon mirror 105, and is calculated according to an expression of T1+T2+T3+T5+T5+T6, and VtgtT is the target speed per rotation of the polygon mirror 105.

By performing the above calculations, the target value setting section 50 distributes the target speed VtgtT per rotation of the polygon motor 104 according to the ratios of the periods T1 to T6 for the respective mirror planes to the period Tall per rotation of the polygon motor 104.

Thereafter, the speed of the polygon motor 104 is controlled in the same manner as in the second embodiment, and therefore description thereof is omitted. It goes without saying that according to the third embodiment, it is possible to provide substantially the same effects as in the case of the second embodiment described above.

It should be understood that the present invention is not limited to the embodiments described above, but various variations of the above described embodiments may be possible without departing from the spirits of the present invention, including variations as described below, for example. The number of target periods or target speeds set for respective mirror planes may be greater than the number of mirror planes; for example, two target periods or target speeds may be set for each mirror plane. This further reduces the variations in the speed of the polygon motor, thus achieving more stable rotation.

Figure 1:
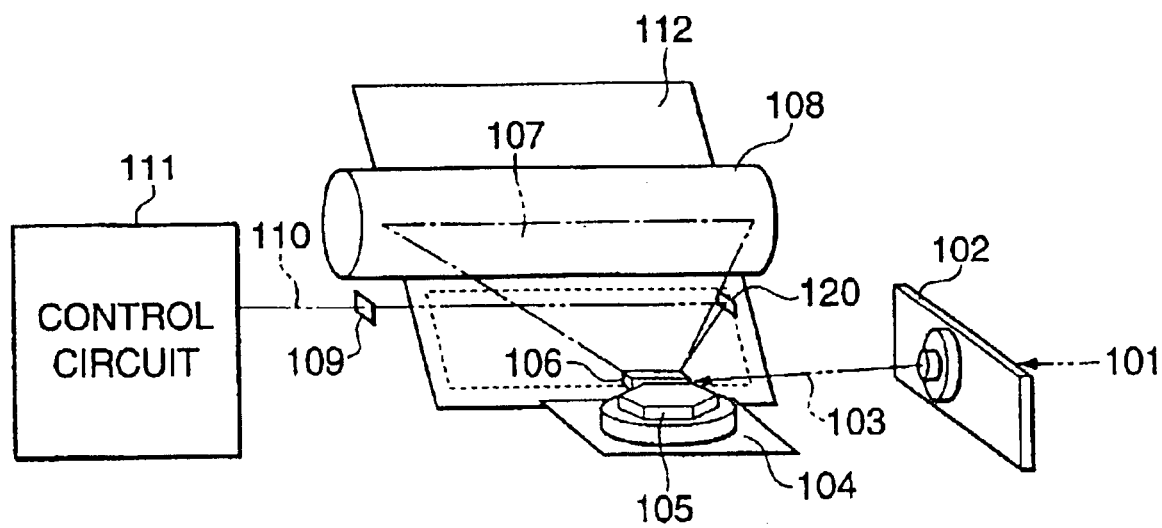
FIG. 1 is a schematic view showing the construction of a conventional exposure scanning system in an electrophotographic printer.
Figure 2:
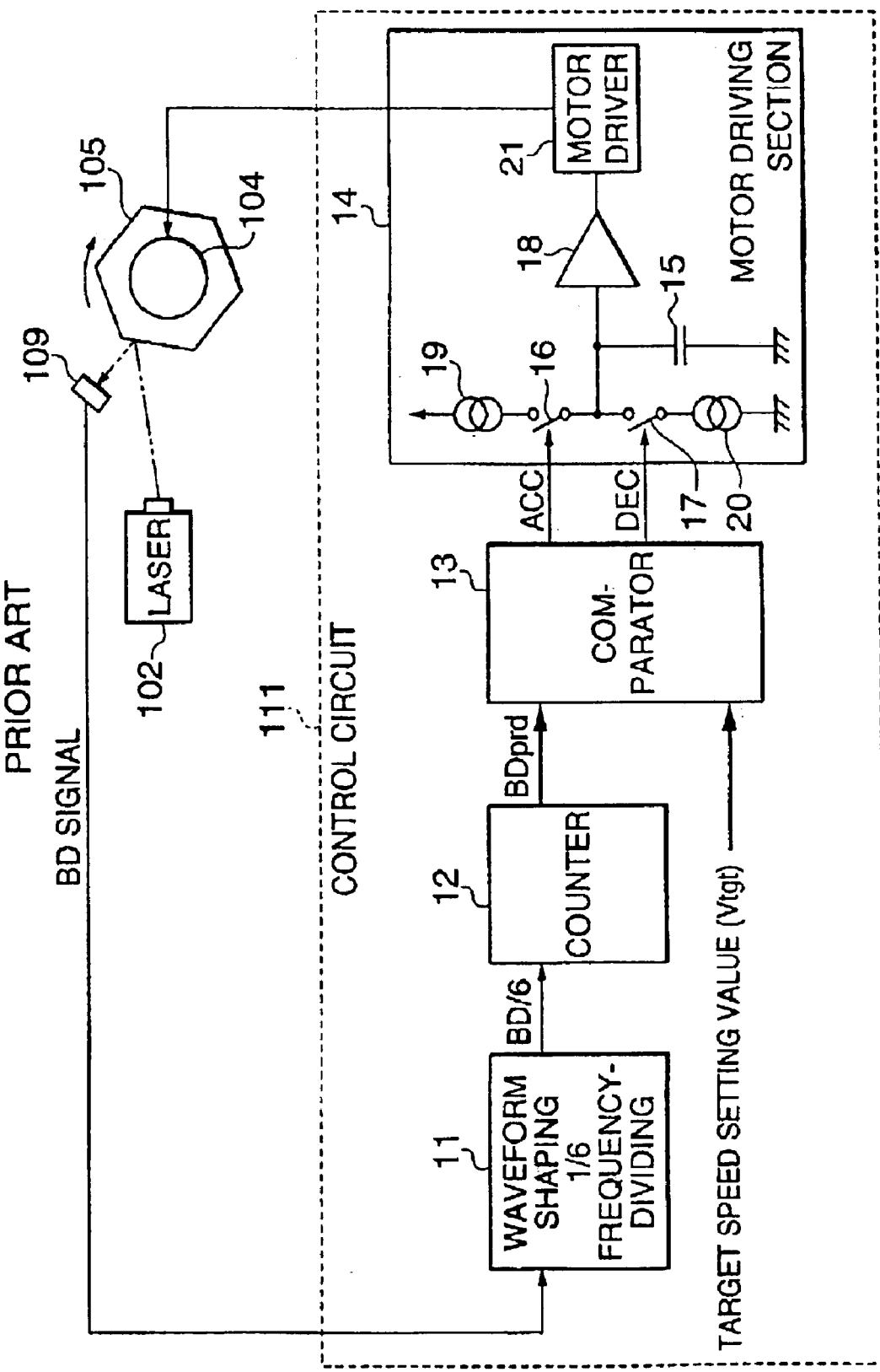
FIG. 2 is a block diagram showing the configuration of a conventional polygon motor control circuit.
Figures 3A, 3B:
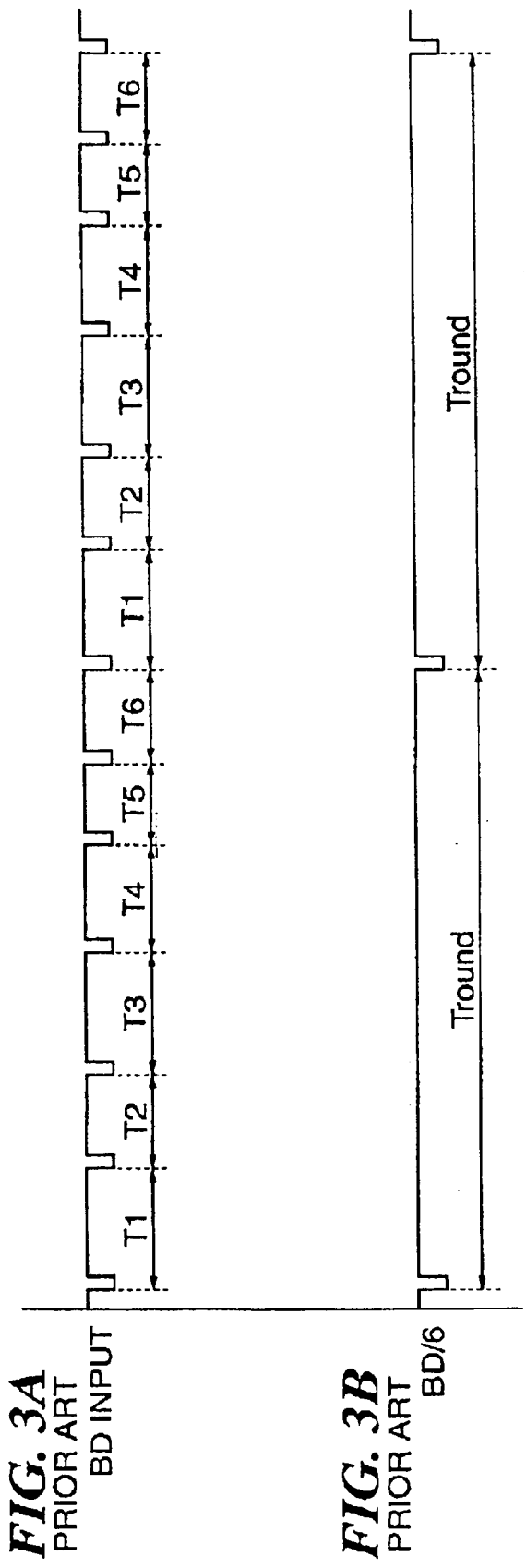
Figure 5:
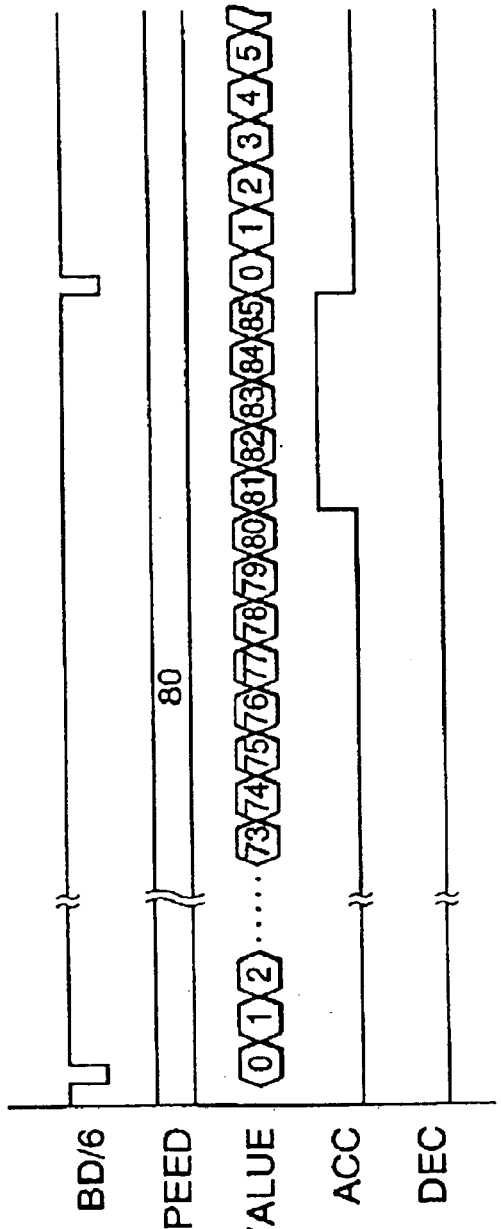
Figure 6:
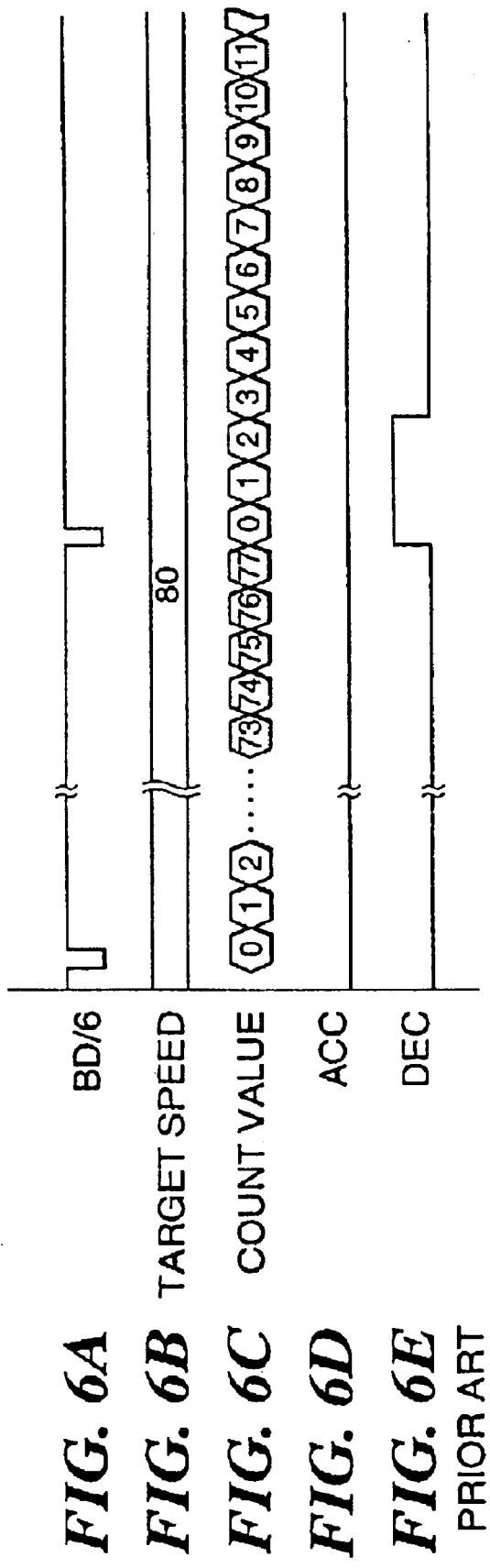

This can be realized by providing the image forming apparatus with a reflecting mirror on which a laser beam is irradiated, when the central position in the main scanning direction is subjected to laser irradiation, in addition to the reflecting mirror 120 shown in FIG. 1

Further, it is possible to control the polygon motor according to the speeds of the respective mirror planes detected by a speed sensor without controlling the polygon motor according to the periods of the respective mirror planes detected by period sensors (such as the reflecting mirror 120 and the photoelectric conversion element 109) as in the above described embodiments.

Further, the present invention may be applied to other image forming apparatuses such as a copying machine and a facsimile machine other than a printer insofar as they have a function of performing exposure scanning while deflecting a laser beam with a rotary polygon mirror. Further, the motor speed control processing function according to the present invention may be realized not only by electronic circuits of hardware but also by software using a sensor system or by hardware and software to which processing is shared.

As described above, according to the present invention, the target rotational speed of the polygon motor that rotates the rotary polygon mirror is set for each of the respective mirror planes of the rotary polygon mirror according to the undivided main scanning synchronizing signal, and therefore, it is possible to easily realize a polygon motor control circuit that enables the polygon motor to rotate steadily with very slight speed variations.

Further, according to the present invention, when the photosensitive drum is exposure-scanned while the polygon mirror deflects the traveling direction of the laser beam for exposure, the period of the laser beam irradiated on the photosensitive drum from the polygon mirror is measured for each mirror plane of the polygon mirror, and the target period (speed) of the polygon motor for driving the polygon mirror is set for each mirror plane according to the measurement result so as to control the polygon motor. As a result, when controlling the rotational speed of the polygon motor to the target speed, it is possible to easily achieve steady rotation of the polygon motor at a low cost with speed variations reduced to the minimum possible level and hence reliably obtain an image which reflects the inputted image signal.

Although the present invention has been described in some detail by way of illustration for purposes of clarity of understanding, it will be apparent that certain changes and modifications may be practiced within the scope of the claims. Such modifications and variations which may be apparent to a person skilled in the art are intended to be within the scope of this invention.

What is claimed is:

1. An image forming apparatus comprising:

a rotary polygon mirror having a plurality of mirror planes that deflect a traveling direction of an exposure light beam;

a photosensitive body; and an exposure scanning section that exposure-scans said photosensitive body while causing said rotary polygon mirror to deflect the traveling direction of the exposure light beam;

wherein said exposure scanning section comprises a polygon motor that rotatively drives said rotary polygon mirror, a setting device that sets a target rotation control variable of said polygon motor for each of the mirror planes of said rotary polygon mirror, and a control device that provides control to drive said polygon motor according to the target rotation control variable set by said setting device.

2. An image forming apparatus according to claim 1, wherein said setting device sets target rotational speed of said polygon motor as the target rotation control variable.

3. An image forming apparatus according to claim 2, wherein said setting device sets target rotational speeds of said polygon motor for respective ones of the mirror planes of said rotary polygon mirror according to one of lengths of the respective ones of the mirror planes of said rotary polygon mirror and rotational periods of the respective ones of the mirror planes of said rotary polygon mirror.

4. An image forming apparatus according to claim 2, wherein said setting device sets target rotational speeds of said polygon motor for respective ones of the mirror planes of said rotary polygon mirror according to one of lengths of the respective ones of the mirror planes of said rotary polygon mirror and rotational periods of the respective ones of the mirror planes of said rotary polygon mirror, a sum of one of the lengths of the respective mirror planes of said rotary polygon mirror and the rotational periods of the respective ones of the mirror planes of said rotary polygon mirror, and the target rotational speed per rotation of said rotary polygon mirror.

5. An image forming apparatus according to claim 2, wherein said setting device sets a plurality of target rotational speeds for each of the mirror planes of said rotary polygon mirror.

6. An image forming apparatus according to claim 2, wherein said setting device sequentially sets target rotational speeds for respective ones of the mirror planes of said rotary polygon mirror according to a main scanning synchronizing signal generated based on light to be incident on predetermined positions of the respective ones of the mirror planes of said rotary polygon mirror.

7. An image forming apparatus according to claim 2, wherein said setting device cyclically sets target rotational speeds for respective ones of the mirror planes of said rotary polygon mirror according to a detection signal indicative of a reference plane of said rotary polygon mirror.

8. An image forming apparatus according to claim 1, wherein said setting device sets target period of said polygon motor as the target rotation control variable.

9. An image forming apparatus according to claim 8, wherein said setting device sets a period with which the light beam irradiated on each of a plurality of exposure scanning lines of said photosensitive body from said rotary polygon mirror is incident on a predetermined position of each of the plurality of exposure scanning lines of said photosensitive body as the target rotation control variable.

10. An image forming apparatus according to claim 8, wherein said setting device sets a ratio of a period of each of the mirror planes of said rotary polygon mirror to a sum of target periods of respective ones of the mirror planes of said rotary polygon mirror as the target rotation control variable.

11. An image forming apparatus according to claim 8, wherein said setting device sets a-period with which the light beam irradiated on each of a plurality of exposure scanning lines of said photosensitive body from said rotary polygon mirror is incident on a plurality of positions-of each of the plurality of exposure scanning lines of said photosensitive body as the target rotation control variable.

* * * * *